United States Patent
Parrish

(10) Patent No.: US 10,738,676 B2
(45) Date of Patent: Aug. 11, 2020

(54) THERMAL REGENERATOR FOR EXHAUST SYSTEM

(71) Applicant: Faurecia Emissions Control Technologies, USA, LLC, Columbus, IN (US)

(72) Inventor: Tony R. Parrish, Columbus, IN (US)

(73) Assignee: Faurecia Emissions Control Technologies, USA, LLC, Columbus, IN (US)

(*) Notice: Subject to any disclaimer, the term of this patent is extended or adjusted under 35 U.S.C. 154(b) by 49 days.

(21) Appl. No.: 16/167,692

(22) Filed: Oct. 23, 2018

(65) Prior Publication Data

US 2020/0123953 A1   Apr. 23, 2020

(51) Int. Cl.
| F01N 3/025 | (2006.01) |
| F01N 3/20 | (2006.01) |
| F01N 3/035 | (2006.01) |
| F01N 3/10 | (2006.01) |

(52) U.S. Cl.
CPC .......... *F01N 3/2066* (2013.01); *F01N 3/035* (2013.01); *F01N 3/103* (2013.01); *F01N 3/106* (2013.01); *F01N 2560/06* (2013.01); *F01N 2610/02* (2013.01)

(58) Field of Classification Search
CPC ...... F01N 3/025; F01N 3/0253; F01N 3/0256; F01N 3/2033; F01N 13/017; F01N 2240/14; F01N 2470/24
See application file for complete search history.

(56) References Cited

U.S. PATENT DOCUMENTS

| 3,775,064 | A | 11/1973 | Berger et al. |
| 5,243,819 | A | 9/1993 | Woerner et al. |
| 5,320,523 | A * | 6/1994 | Stark .................. F23N 5/20 431/353 |
| 5,525,308 | A | 6/1996 | Oser |
| 5,711,149 | A | 1/1998 | Araki |
| 6,021,639 | A | 2/2000 | Abe et al. |
| 6,595,003 | B2 | 7/2003 | Dalla Betta et al. |
| 6,615,580 | B1 | 9/2003 | Khair et al. |
| 6,973,778 | B2 | 12/2005 | Kondou et al. |
| 7,032,376 | B1 | 4/2006 | Webb et al. |
| 7,367,182 | B2 | 5/2008 | Takahashi et al. |
| 7,908,847 | B2 * | 3/2011 | Crawley .............. F01N 3/025 60/297 |
| 8,037,673 | B2 | 10/2011 | Gonze et al. |
| 8,991,157 | B2 * | 3/2015 | Mastbergen .......... F01N 3/025 60/295 |
| 9,103,253 | B2 | 8/2015 | Birkby et al. |
| 2002/0104312 | A1 | 8/2002 | Hoffman et al. |
| 2004/0255588 | A1 | 12/2004 | Lundberg et al. |
| 2005/0000209 | A1 | 1/2005 | Takahashi et al. |
| 2006/0179821 | A1 | 8/2006 | Zhan et al. |
| 2006/0283181 | A1 | 12/2006 | Crawley et al. |

(Continued)

*Primary Examiner* — Jonathan R Matthias
(74) *Attorney, Agent, or Firm* — Carlson, Gaskey & Olds, P.C.

(57) ABSTRACT

An exhaust component includes a housing defining an internal cavity and a burner positioned within the internal cavity. The burner provides a combustion chamber having an exhaust gas inlet, a fuel inlet, a combustion air inlet, and an outlet. At least one exhaust aftertreatment component is positioned within the internal cavity and is directly coupled to the outlet of the combustion chamber.

25 Claims, 1 Drawing Sheet

(56) References Cited

U.S. PATENT DOCUMENTS

| | | |
|---|---|---|
| 2008/0087013 A1 | 4/2008 | Crawley et al. |
| 2008/0264042 A1 | 10/2008 | Khadiya |
| 2009/0241520 A1 | 10/2009 | Gendron et al. |
| 2012/0291422 A1* | 11/2012 | Yacoub .................... F01N 3/04 60/274 |
| 2017/0114698 A1 | 4/2017 | Jerges et al. |

* cited by examiner

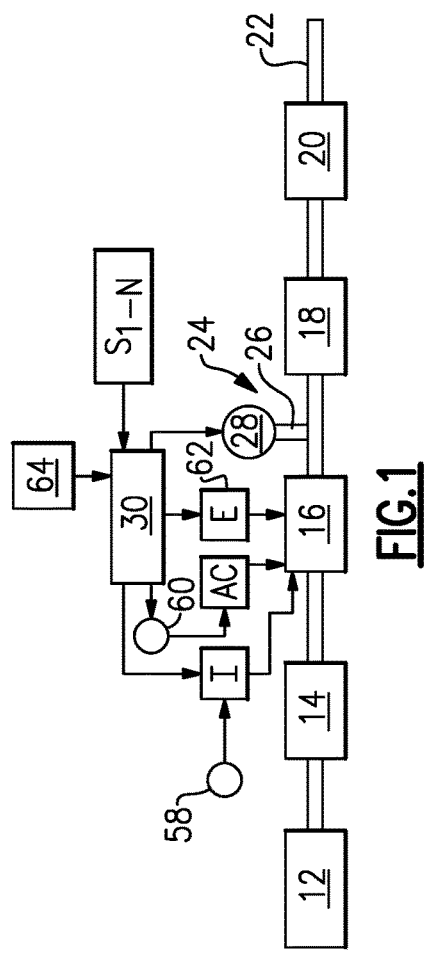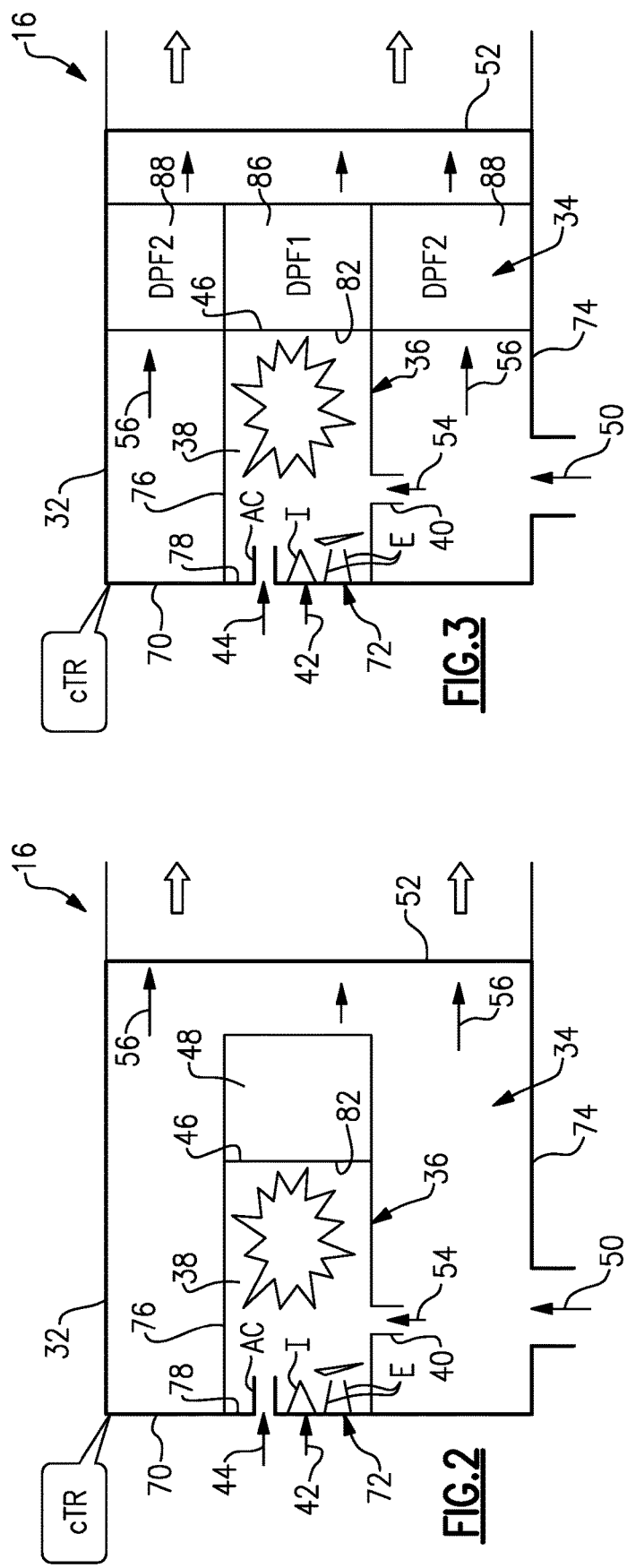

THERMAL REGENERATOR FOR EXHAUST SYSTEM

BACKGROUND OF THE INVENTION

A thermal system is used to elevate the temperature of exhaust gas to activate a selective catalytic reduction (SCR) catalyst in a vehicle exhaust system. The SCR catalyst reduces levels of NOx using ammonia as a reductant. The reducing agent, such as diesel exhaust fluid (DEF) for example, reacts with NOx to convert pollutants into nitrogen and water. Under certain operating conditions, such as cold start conditions, exhaust temperatures are not initially high enough to support efficient operation of the SCR catalyst. This can lead to urea deposit formation from the DEF injection. It is therefore desirable to provide a thermal management system that can ensure that the SCR catalyst is operating efficiently and optimally under all conditions.

SUMMARY OF THE INVENTION

In one exemplary embodiment, and exhaust component includes a housing defining an internal cavity and a burner positioned within the internal cavity. The burner provides a combustion chamber having an exhaust gas inlet, a fuel inlet, a combustion air inlet, and an outlet. At least one exhaust aftertreatment component is positioned within the internal cavity and is directly coupled to the outlet of the combustion chamber.

In a further embodiment of the above, the at least one exhaust aftertreatment component comprises at least one of a DOC, a PNA, a CSC, or a DPF In a further embodiment of any of the above, the housing has an exhaust flow inlet configured to receive engine exhaust gas and an exhaust flow outlet configured to direct exhaust gas into a SCR catalyst.

In a further embodiment of any of the above, only a portion of the exhaust gas from the exhaust flow inlet enters the exhaust gas inlet of the combustion chamber and a remaining portion of the exhaust gas bypasses the burner.

In another exemplary embodiment, a vehicle exhaust system includes an upstream exhaust component configured to receive engine exhaust gas and a thermal regenerator having a housing defining an internal cavity and a burner positioned within the internal cavity. The burner provides a combustion chamber having an exhaust gas inlet, a fuel inlet, a combustion air inlet, and an outlet. At least one exhaust aftertreatment component is positioned within the internal cavity and is directly coupled to the outlet of the combustion chamber. At least one additional exhaust aftertreatment component is positioned downstream of the thermal regenerator.

In a further embodiment of any of the above, the at least one additional exhaust aftertreatment component comprises a SCR catalyst.

In a further embodiment of any of the above, an injector is positioned downstream of the thermal regenerator and upstream of the SCR catalyst, wherein the injector is configured to inject a reducing agent into the exhaust gas flow exiting the thermal regenerator.

In a further embodiment of any of the above, the burner includes an igniter to ignite fuel mixed with combustion air and exhaust gas within the combustion chamber, and wherein the burner switches from a burning mode to a dosing mode when the at least one exhaust aftertreatment component reaches a predetermined temperature level.

An exemplary method comprises providing a housing defining an internal cavity and positioning a burner within the internal cavity where the burner provides a combustion chamber having an exhaust gas inlet, a fuel inlet, a combustion air inlet, and an outlet. The method further includes positioning at least one exhaust aftertreatment component within the internal cavity and directly coupling the at least one exhaust aftertreatment component to the outlet of the combustion chamber. The at least one exhaust aftertreatment component comprises at least one of a DOC, a PNA, a CSC, or DPF. The method further includes activating the burner to be in a burning mode to increase exhaust gas temperature when a temperature of the at least one exhaust aftertreatment component is below a predetermined temperature level, and positioning at least one additional exhaust aftertreatment component downstream of the thermal regenerator to receive exhaust gases exiting the thermal regenerator.

In a further embodiment of any of the above, the method includes switching from the burning mode to a dosing mode when the at least one exhaust aftertreatment component reaches the predetermined temperature level.

In a further embodiment of any of the above, the housing has an exhaust flow inlet configured to receive engine exhaust gas and an exhaust flow outlet configured to direct exhaust gas into the at least one additional exhaust aftertreatment component, and the method includes directing only a portion of the exhaust gas from the exhaust flow inlet into the exhaust gas inlet of the combustion chamber and directing a remaining portion of the exhaust gas to bypass the burner.

These and other features of this application will be best understood from the following specification and drawings, the following of which is a brief description.

BRIEF DESCRIPTION OF THE DRAWINGS

FIG. 1 is a schematic diagram of a vehicle exhaust system incorporating the subject invention.

FIG. 2 is a schematic representation of one example of a thermal regenerator from the system of FIG. 1 that incorporates the subject invention.

FIG. 3 is a schematic representation of another example of a thermal regenerator from the system of FIG. 1 that incorporates the subject invention.

DETAILED DESCRIPTION

FIG. 1 shows a schematic representation of a vehicle exhaust system 10 that conducts hot exhaust gases generated by an engine 12 through various exhaust components to reduce emission and control noise as known. In one example configuration, the exhaust system 10 includes at least an upstream exhaust component 14 that is positioned downstream of the engine 12, a thermal regenerator 16 that is positioned downstream from the upstream exhaust component 14, and at least one additional exhaust aftertreatment component 18 that is positioned downstream of the thermal regenerator 16. In one example, the upstream exhaust component 14 comprises an exhaust manifold, turbocharger, a catalyst or one or more exhaust pipes that are connected to an upstream end of the thermal regenerator 16.

In one example, the at least one additional exhaust aftertreatment component 18 comprises a selective catalytic reduction (SCR) or SCR with a filter (SCRF) that is positioned downstream of the thermal regernator 16. One or more additional exhaust aftertreatment components 20, such as a diesel oxidation catalyst (DOC) or a combination of a DOC and a diesel particulate filter (DPF) for example, can also be included in the system 10. Additionally, a mixer component may be incorporated into the system between the SCR 18 and the thermal regenerator 16.

FIG. 1 shows one example arrangement of the exhaust aftertreatment components 14, 16, 18, 20. The components 14, 16, 18, 20 can be used in any combination and can be configured in different arrangements as needed to suit a specific application. Once the exhaust gas exits the aftertreatment components 14, 16, 18, 20, the exhaust gas flows through any additional exhaust components such as resonators, mufflers, etc., and then exits the system 10 via a tailpipe 22.

The exhaust system 10 includes an injection system 24 that injects fluid, for example ammonia, a diesel exhaust fluid (DEF), e.g, AdBlue, or a reducing agent such as a solution of urea and water, upstream of the exhaust aftertreatment component 18, e.g. the selective catalytic reduction (SCR) catalyst, to mix with an exhaust gas stream exiting an outlet end of the thermal regenerator 16. The injection system 24 includes a doser or injector 26 that receives fluid from a fluid supply 28 and a controller 30 that controls injection of the fluid. Any type of fluid supply 28 and injector/doser 26 can be used with the system. The structure and operation of the supply 28 and injector/doser 26 are well known and will not be discussed in further detail.

FIG. 2 is a schematic representation of one example of a thermal regenerator from the system 10 of FIG. 1. The thermal regenerator 16 includes a housing 32 defining an internal cavity 34 and a burner 36 positioned within the internal cavity 34. The burner 36 provides a combustion chamber 38 having an exhaust gas inlet 40, a fuel inlet 42, a combustion air inlet 44, and an outlet 46. At least one exhaust aftertreatment component 48 is positioned within the internal cavity 34 and is directly coupled to the outlet 46 of the combustion chamber 38. As discussed above, at least one additional exhaust aftertreatment component 18, e.g. at least one SCR catalyst, is positioned downstream of the thermal regenerator 16, and thus exhaust gas exiting the thermal regenerator 16 is subsequently directed into the SCR catalyst 18.

In the example of FIG. 2, the at least one exhaust aftertreatment component 48 that is coupled directly to the outlet 46 from the burner 36 comprises at least one of a diesel oxidation catalyst (DOC), a passive NOx adsorber (PNA), or a cold start catalyst (CSC). The housing 32 has an exhaust flow inlet 50 configured to receive engine exhaust gas from the engine 12 and an exhaust flow outlet 52 configured to direct exhaust gas into the SCR catalyst 18. Only a portion 54 of the exhaust gas from the exhaust flow inlet 50 enters the exhaust gas inlet 40 of the combustion chamber 38 and a remaining portion 56 of the exhaust gas bypasses the burner 36.

The fuel inlet 42 includes a fuel injector I that is connected to a fuel supply 58 and the combustion air inlet 44 includes an air conduit AC that is connected to an air supply via other conduits or pipes. The combustion air supply is separate and distinct from the exhaust gas that enters the internal cavity 34 via the exhaust gas inlet 50. An electric air pump 60 or a smog pump can be used to supply the combustion air. Optionally, the combustion air can be taken from a turbocharger, e.g. an upstream component 14. An ignitor 62 is used to generate a spark to initiate combustion of the mixture of fuel, combustion air, and exhaust gas within the combustion chamber 38. In one example, the ignitor 62 comprises one or more electrodes E or other similar structures that are capable of initiating ignition.

A controller 30 controls the supply of fuel and combustion air. The controller 30 can be the same controller used to control injection of the fluid, e.g. DEF, via the injector 26, or separate controllers can be used. The controller 30 is configured to switch the burner 36 between an active or burning mode and a dosing mode as needed depending on the temperature of the exhaust aftertreatment component 48 and/or other factors. For example, the burner switches from the burning mode to the dosing mode when the exhaust aftertreatment component 48 reaches a predetermined temperature level. One or more temperature sensors 64 communicate temperature data to the controller 30. The temperature sensors 64 can measure exhaust gas temperatures at various locations within the thermal generator 16 and/or upstream/downstream of the thermal regenerator 16 as needed to control operation of the burner 36. Other sensors $S_{1-N}$ can communicate data to the controller 30, such as fuel flow rate, oxygen content inside the combustion chamber, the amount of exhaust gas flow entering the chamber, etc.

In both the burning mode and the dosing mode, fuel is injected into the exhaust gas. In the burning mode, an actual flame is created. In the dosing mode, the fuel is oxidized by a catalyst, e.g. DOC or catalyzed DPF, and there is not a flame present.

In one example, the exhaust aftertreatment component 48 is a DOC. Fuel is combusted if there is enough oxygen available within the combustion chamber 38, or the fuel is used to dose the DOC if the DOC is hot enough to oxidize the fuel. The inclusion of a separate combustion air source improves the combustion process as does the fact that only portion of the exhaust flow from the engine passes through the DOC. A PNA or PSC can be used instead of a DOC to minimize hydrocarbon slip out of the combustion chamber 38.

During a cold-start of the engine 12, the thermal regenerator 16 is used to rapidly heat up the SCR 18. If the DOC is hot enough, the thermal regenerator 16 switches from the burning mode to a dosing mode. This significantly reduces the less combustion airflow rate. One disadvantage is that the thermal regenerator may not be able to perform DPF regenerations or SCR de-sulphations at all engine conditions; however, the thermal regenerator 16 can perform these tasks at cruise and idle conditions.

The controller 30 is configured to protect the exhaust aftertreatment component 48 from damage due to thermal degradation. The main factors that control flame temperature are fuel flow rate, oxygen content inside the combustion chamber, and the amount of exhaust gas flow that is allowed into the combustion chamber 38. These factors are managed by the controller 30 using sensor data to prevent damage to the exhaust aftertreatment component 48.

In one example, the housing 32 has an enclosed end wall 70 that includes the fuel inlet 42 and combustion air inlet 44. The end wall 70 may also include a mount area 72 for the ignitor 62. The end wall 70 is opposite the open end of the housing 32 that comprises the exhaust flow outlet 52. The housing 32 has an outer wall 74 that extends between the enclosed end wall 70 and the open end with the exhaust flow outlet 52. The exhaust flow inlet 50 is formed in the outer wall 74 and introduces exhaust gas flow in a direction that is transverse to a central axis of the burner 36. In one example, the exhaust flow inlet 50 is in axial alignment with the exhaust gas inlet 40 to the combustion chamber 38.

The burner 36 has a burner housing 76 within which the combustion chamber 38 is located. The burner housing 76 has an enclosed end 78 that includes the fuel inlet 42 and combustion air inlet 44. The enclosed end 78 may also include a mount area for the ignitor 62. The enclosed end wall 78 is opposite the open end of the burner housing 76 that comprises the outlet 46 of the combustion chamber 38. The burner housing 76 has an outer wall that extends between the enclosed end 78 and the open end 80 with the outlet 46. The exhaust gas inlet 40 is formed in the outer wall of the burner housing 76 and introduces exhaust gas flow in a direction that is transverse to a central axis of the burner 36. This direction is also transverse to an injection direction of the fuel and an air supply direction of the combustion air. This facilitates thorough mixing of the fuel, combustion air, and exhaust gas within the combustion chamber 38.

The outlet 46 is directly coupled to an inlet 82 to the exhaust aftertreatment component 48, i.e. there are no intervening components between the burner 36 and the exhaust aftertreatment component 48. In the example of FIG. 2, the exhaust aftertreatment component 48 is a DOC, PNA, or CSC. Flow exiting an outlet 84 of the DOC, PNA, or CSC enters the internal cavity 34 near the exhaust flow outlet 52 of the housing 32 and combines with the remaining bypass flow 56 to exit the thermal regenerator 16. This flow is then directed into the downstream aftertreatment components 18.

FIG. 3 shows an example that is similar to FIG. 2; however, in this example, the at least one exhaust aftertreatment component 48 comprises a first catalyzed DPF 86 that is coupled directly to the outlet 46 from the combustion chamber 38. The outlet 46 is directly coupled to the inlet 82 to the exhaust aftertreatment component 48, i.e. there are no intervening components between the burner 36 and the exhaust aftertreatment component 48.

Optionally, a second DPF 88 can also be located within the internal cavity 34 through which the remaining portion 56 of the exhaust gas passes prior to exiting the exhaust flow outlet 52. The second DPF 88 extends from an outer surface of the first DPF 86 and/or an outer surface of the burner housing 76 to an inner surface of the housing 32 such that all of the remaining bypass flow 56 that does not enter the combustion chamber 38 flows through the second DPF 88 before exiting the thermal regenerator 16. Thus, all exhaust is filtered before exiting the tailpipe 22.

In one example, the second DPF 88 surrounds the first DPF 86 and has an open center that receives the first DPF 86. As such, the second DPF 88 is radially outward of the first DPF 86 as a ring or donut shaped component. The second DPF could also surround at least a portion of the burner housing 76. Flow exiting the outlet 84 of the first DPF 86 enters the internal cavity 34 near the exhaust flow outlet 52 of the housing 32 and combines with the remaining bypass flow 56 exiting the second DPF 88 to exit the thermal regenerator 16. This flow is then directed into the downstream aftertreatment components 18, e.g. a SCR, DPF, etc. This configuration allows for passive regeneration of both DPFs 86, 88; however, there has to be a DOC upstream of the thermal regenerator 16 to achieve this function.

The inner DPF 86 should have a relatively high amount of Platinum Group Metals (PGM) because it will be dosed with diesel fuel. The outer DPF 88 can have a low amount of PGM. The outer DPF 88 only needs to have enough PGM to allow for passive regeneration.

The subject invention comprises a Catalyzed Thermal Regenerator (cTR) that provides a method and apparatus for thermal management of a SCR catalyst without using the engine. This is accomplished by having an exhaust aftertreatment component 48 directly coupled to the outlet from the combustion chamber 38. Only a portion of the total engine exhaust flow passes through the exhaust aftertreatment component 48 so it is easier to heat it up to the optimal temperature range with the burner 36. Once at temperature, the burner flame is extinguished and the exhaust aftertreatment component 48 can be dosed by fuel injection. This enables a rapid heating up of the SCR catalyst and additionally keeps the SCR catalyst in its optimal temperature range. Additionally, urea deposit formation from DEF injection upstream of the SCR catalyst is eliminated or at least significantly reduced. If a CSC or PNA is used, hydrocarbon slip from the combustion process is minimized, which can address concerns about hydrocarbon poisoning of the SCR catalyst.

The subject thermal regenerator 16 can be used to achieve Ultra-Low NOx (ULN) levels, e.g. 0.02 g/bhp*hr, when combined with an aftertreatment system (ATS). Further, only standard fluids, e.g. diesel fuel and DEF, are needed on the vehicle. Further, while two SCRs may be needed to achieve ULN levels, only one DEF injection point is required. Finally, heated dosing can be provided when directly coupled to a mixer or decomposition tube positioned upstream of the SCR.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An exhaust component comprising:
   a housing having an inner surface defining an internal cavity;
   a burner positioned within the internal cavity, the burner providing a combustion chamber having an exhaust gas inlet, a fuel inlet, a combustion air inlet, and an outlet that is spaced apart from the inner surface; and
   at least one exhaust aftertreatment component positioned within the internal cavity and directly coupled to the outlet of the combustion chamber.

2. The exhaust component according to claim 1, wherein the at least one exhaust aftertreatment component comprises at least one of a DOC, a PNA, a CSC, or a DPF.

3. The exhaust component according to claim 1, wherein the housing has an exhaust flow inlet configured to receive engine exhaust gas and an exhaust flow outlet coupled to an SCR inlet component configured to direct exhaust gas into a SCR catalyst.

4. The exhaust component according to claim 3, wherein only a portion of the exhaust gas from the exhaust flow inlet enters the exhaust gas inlet of the combustion chamber and a remaining portion of the exhaust gas flows within the internal cavity between the burner and the inner surface of the housing to bypass the burner.

5. The exhaust component according to claim 4, wherein the at least one exhaust aftertreatment component comprises a first DPF coupled directly to the outlet from the combustion chamber, and including a second DPF within the internal cavity through which the remaining portion of the exhaust gas passes prior to exiting the exhaust flow outlet.

6. The exhaust component according to claim 5, wherein the second DPF surrounds the first DPF.

7. The exhaust component according to claim 3, wherein the housing includes an enclosed end, an opposite open end that forms the exhaust flow outlet, and an outer wall that extends between the enclosed and the open ends, and wherein the fuel inlet and the combustion air inlet are formed in the enclosed end, and wherein the exhaust flow inlet is formed within the outer wall.

8. The exhaust component according to claim 1, wherein the burner includes an igniter to ignite fuel mixed with combustion air and exhaust gas within the combustion chamber.

9. The exhaust component according to claim 1, including a controller to control the burner to switch from a burning mode to a dosing mode when the at least one exhaust aftertreatment component reaches a predetermined temperature level.

10. The exhaust component according to claim 9, wherein the at least one exhaust aftertreatment component comprises a catalyst, and wherein in both the burning mode and the dosing mode, fuel is injected into the exhaust gas, and wherein in the burning mode a flame is created and in the dosing mode the fuel is oxidized by the catalyst and there is not a flame present.

11. The exhaust component according to claim 10, wherein the catalyst comprises a DOC, a pPNA, a catalyzed DPF, or a CSC.

12. A vehicle exhaust system comprising:
an upstream exhaust component configured to receive engine exhaust gas;
a thermal regenerator having
a housing having an inner surface defining an internal cavity,
a burner positioned within the internal cavity, the burner providing a combustion chamber having an exhaust gas inlet, a fuel inlet, a combustion air inlet, and an outlet that is spaced apart from the inner surface, and
at least one exhaust aftertreatment component positioned within the internal cavity and directly coupled to the outlet of the combustion chamber; and
at least one additional exhaust aftertreatment component positioned downstream of the thermal regenerator.

13. The vehicle exhaust system according to claim 12, wherein the at least one additional exhaust aftertreatment component comprises a SCR catalyst.

14. The vehicle exhaust system according to claim 13, including an injector positioned downstream of the thermal regenerator and upstream of the SCR catalyst, wherein the injector is configured to inject a reducing agent into the exhaust gas flow exiting the thermal regenerator.

15. The vehicle exhaust system according to claim 12, wherein the at least one exhaust aftertreatment component comprises at least one of a DOC, a PNA, a CSC, or DPF.

16. The vehicle exhaust system according to claim 12, wherein the housing has an exhaust flow inlet configured to receive engine exhaust gas and an exhaust flow outlet configured to direct exhaust gas into the at least one additional exhaust after treatment component.

17. The vehicle exhaust system according to claim 16, wherein only a portion of the exhaust gas from the exhaust flow inlet enters the exhaust gas inlet of the combustion chamber and a remaining portion of the exhaust gas flows within the internal cavity between the burner and the inner surface of the housing to bypass the burner.

18. The vehicle exhaust system according to claim 17, wherein the at least one exhaust aftertreatment component comprises a first DPF coupled directly to the outlet from the combustion chamber, and including a second DPF within the internal cavity through which the remaining portion of the exhaust gas passes prior to exiting the exhaust flow outlet.

19. The vehicle exhaust system according to claim 12, wherein the burner includes an igniter to ignite fuel mixed with combustion air and exhaust gas within the combustion chamber, and wherein the burner switches from a burning mode to a dosing mode when the at least one exhaust aftertreatment component reaches a predetermined temperature level.

20. The vehicle exhaust system according to claim 19, wherein the at least one exhaust aftertreatment component comprises a catalyst, and wherein in both the burning mode and the dosing mode, fuel is injected into the exhaust gas, and wherein in the burning mode a flame is created and in the dosing mode the fuel is oxidized by the catalyst and there is not a flame present.

21. The exhaust component according to claim 20, wherein the catalyst comprises a DOC, a pPNA, a catalyzed DPF, or a CSC.

22. A method comprising:
providing a housing having an inner surface defining an internal cavity;
positioning a burner within the internal cavity, the burner providing a combustion chamber having an exhaust gas inlet, a fuel inlet, a combustion air inlet, and an outlet that is spaced apart from the inner surface;
positioning at least one exhaust aftertreatment component within the internal cavity and directly coupling the at least one exhaust aftertreatment component to the outlet of the combustion chamber, and wherein the at least one exhaust aftertreatment component comprises at least one of a DOC, a PNA, a CSC, or DPF;
activating the burner to be in a burning mode to increase exhaust gas temperature when a temperature of the at least one exhaust aftertreatment component is below a predetermined temperature level; and
positioning at least one additional exhaust aftertreatment component downstream of the thermal regenerator to receive exhaust gases exiting the thermal regenerator.

23. The method according to claim 22, including switching from the burning mode to a dosing mode when the at least one exhaust aftertreatment component reaches the predetermined temperature level.

24. The method according to claim 23, wherein in both the burning mode and the dosing mode, fuel is injected into the exhaust gas, and wherein in the burning mode a flame is created via the fuel and in the dosing mode the fuel is oxidized by the at least one exhaust aftertreatment component and there is not a flame present.

25. The method according to claim 22, wherein the housing has an exhaust flow inlet configured to receive engine exhaust gas and an exhaust flow outlet configured to direct exhaust gas into the at least one additional exhaust aftertreatment component, and including directing only a portion of the exhaust gas from the exhaust flow inlet into the exhaust gas inlet of the combustion chamber and directing a remaining portion of the exhaust gas to flow within the internal cavity between the burner and the inner surface of the housing to bypass the burner.

* * * * *

UNITED STATES PATENT AND TRADEMARK OFFICE
CERTIFICATE OF CORRECTION

PATENT NO. : 10,738,676 B2
APPLICATION NO. : 16/167692
DATED : August 11, 2020
INVENTOR(S) : Tony R. Parrish Page 1 of 1

It is certified that error appears in the above-identified patent and that said Letters Patent is hereby corrected as shown below:

In the Claims

Claim 10, Column 7, Line 13; replace "the exhaust gas" with --exhaust gas--

Claim 14, Column 7, Lines 42-43; replace "the exhaust gas flow" with --an exhaust gas flow--

Claim 21, Column 8, Line 17; replace "The exhaust component" with --The vehicle exhaust system--

Claim 22, Column 8, Line 38; replace "the thermal regenerator" with --the housing--

Claim 22, Column 8, Line 39; replace "the thermal regenerator" with --the housing--

Signed and Sealed this
Fifth Day of April, 2022

Drew Hirshfeld
*Performing the Functions and Duties of the
Under Secretary of Commerce for Intellectual Property and
Director of the United States Patent and Trademark Office*